(12) United States Patent
Hihara et al.

(10) Patent No.: US 9,281,505 B2
(45) Date of Patent: Mar. 8, 2016

(54) BATTERY MOUNTING STRUCTURE FOR VEHICLE

(71) Applicant: TOYOTA JIDOSHA KABUSHIKI KAISHA, Toyota-shi (JP)

(72) Inventors: Yasuyuki Hihara, Toyota (JP); Hiroaki Iwamoto, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/433,709

(22) PCT Filed: Oct. 16, 2012

(86) PCT No.: PCT/JP2012/076731
§ 371 (c)(1),
(2) Date: Apr. 6, 2015

(87) PCT Pub. No.: WO2014/061109
PCT Pub. Date: Apr. 24, 2014

(65) Prior Publication Data
US 2015/0249240 A1 Sep. 3, 2015

(51) Int. Cl.
| | |
|---|---|
| *B60R 16/04* | (2006.01) |
| *H01M 2/10* | (2006.01) |
| *B60K 1/04* | (2006.01) |
| *B62D 21/15* | (2006.01) |
| *B62D 25/20* | (2006.01) |
| *H01M 8/10* | (2006.01) |
| *H01M 8/24* | (2006.01) |

(52) U.S. Cl.
CPC .............. *H01M 2/1083* (2013.01); *B60K 1/04* (2013.01); *B62D 21/157* (2013.01); *B62D 25/20* (2013.01);
(Continued)

(58) Field of Classification Search
CPC ... H01M 2/10; H01M 2/1083; H01M 8/2465; H01M 8/2475; B60K 2001/0422; B60K 2001/0427; B60K 2001/0433; B60K 2001/0438; B62D 21/15; B62D 21/155; B62D 21/157; B62D 25/20; B62D 25/2009
USPC ........................................................ 180/68.5
See application file for complete search history.

(56) References Cited

U.S. PATENT DOCUMENTS 4,726,707 A 2/1988 Newton et al.
8,118,125 B2 * 2/2012 Suzuki ..................... B60K 1/04
180/68.5

(Continued)

FOREIGN PATENT DOCUMENTS

JP 2011-146341 7/2011
JP 2012-89377 5/2012

(Continued)

OTHER PUBLICATIONS

International Search Report issued Dec. 11, 2012, in PCT/JP2012/076731, filed Oct. 16, 2012.

*Primary Examiner* — John Walters
(74) *Attorney, Agent, or Firm* — Oblon, McClelland, Maier & Neustadt, L.L.P.

(57) ABSTRACT

A battery mounting structure for a vehicle includes a battery frame upper fabricated of fiber-reinforced resin, a battery frame lower fabricated of fiber-reinforced resin, and an intermediate member fabricated of fiber-reinforced resin. A battery that is disposed at a vehicle body lower side of a floor panel is attached at the battery frame upper. With the battery frame upper the battery frame lower structures a closed cross section structure. The intermediate member is interposed between the battery frame upper and the battery frame lower. The intermediate member is provided with a plural number of upper end portions that abut against or are disposed close to a lower face of the battery frame upper and a plural number of lower end portions that abut against or are disposed close to an upper face of the battery frame lower.

5 Claims, 10 Drawing Sheets

(52) U.S. Cl.
CPC .............. *H01M 2/10* (2013.01); *H01M 8/1072* (2013.01); *H01M 8/1083* (2013.01); *H01M 8/2475* (2013.01); *B60K 2001/0438* (2013.01); *B60Y 2306/01* (2013.01); *H01M 2220/20* (2013.01); *H01M 2250/20* (2013.01)

(56) References Cited

U.S. PATENT DOCUMENTS

| 8,403,090 | B2 * | 3/2013 | Fujiwara | H01M 2/1077 180/68.5 |
|---|---|---|---|---|
| 8,689,919 | B2 * | 4/2014 | Maeda | B62D 21/157 180/311 |
| 8,910,737 | B2 * | 12/2014 | Saeki | B60K 1/04 180/68.5 |
| 2010/0080941 | A1 | 4/2010 | McCarville et al. | |
| 2012/0103714 | A1 | 5/2012 | Choi et al. | |
| 2012/0125703 | A1 | 5/2012 | Arns | |
| 2012/0183828 | A1 | 7/2012 | Van Den Akker | |
| 2012/0321927 | A1 | 12/2012 | Loo et al. | |

FOREIGN PATENT DOCUMENTS

| JP | 2012-94476 | 5/2012 |
|---|---|---|
| WO | 00/22250 A1 | 4/2000 |

\* cited by examiner

BATTERY MOUNTING STRUCTURE FOR VEHICLE

TECHNICAL FIELD

The present invention relates to a battery mounting structure for a vehicle.

BACKGROUND ART

A driving battery is disposed at the lower side of a floor portion of an electric vehicle. Structuring a battery case that accommodates the driving battery in a two-layer structure of an upper plate and a lower plate formed of a resin material (a fiber-reinforced resin composite material) has been known since heretofore (for example, see Japanese Patent Application Laid-Open (JP-A) Nos. 2012-94476 and 2011-146341).

A vehicle battery container that has also been known since heretofore has a two-layer structure formed of an inner wall and an outer wall. A connection piece is formed by inflection so as to protrude from the inner wall toward the outer wall at an acute angle, and the outer wall and inner wall are connected by this connection piece (for example, see JP-A No. 2012-89377).

SUMMARY OF INVENTION

Technical Problem

However, when an interference object on a road surface, such as a protruding kerbstone on a road, a rock sticking up from a poor road or the like, interferes with the lower plate (or outer plate) of a battery case, the lower plate (or outer plate) is deformed so as to bow upward, and may be damaged. Therefore, there is a room for improvement in structures that improve the strength of a battery case (or battery frame) with respect to loads inputted from a vehicle body lower side.

Accordingly, a subject of the present invention is to provide a battery mounting structure for a vehicle that may improve the strength of a battery frame formed of a fiber-reinforced resin material with respect to loads inputted from the vehicle body lower side.

Solution to Subject

In order to achieve the subject described above, a battery mounting structure for a vehicle according to a first aspect relating to the present invention includes: a battery frame upper member fabricated of fiber-reinforced resin to which a battery is attached, the battery being disposed at a vehicle body lower side of a floor panel; a battery frame lower member fabricated of fiber-reinforced resin that, with the battery frame upper member, structures a closed cross section structure; and an intermediate member fabricated of fiber-reinforced resin that is interposed between the battery frame upper member and the battery frame lower member, the intermediate member being provided with a plurality of upper end portions that abut against or are disposed close to a lower face of the battery frame upper member and a plurality of lower end portions that abut against or are disposed close to an upper face of the battery frame lower member.

According to the first aspect relating to the present invention, the closed cross section structure is formed by the battery frame upper member and the battery frame lower member. The intermediate member is interposed between the battery frame upper member and the battery frame lower member. The intermediate member is provided with the plural upper end portions that abut against or are disposed close to the lower face of the battery frame upper member, and the plural lower end portions that abut against or are disposed close to the upper face of the battery frame lower member.

Therefore, if a load is inputted to the battery frame from the vehicle body lower side and the battery frame (the battery frame lower member) is deformed so as to bow toward the vehicle body upper side, because the intermediate member braces between the battery frame lower member and the battery frame upper member, the deformation is suppressed. Thus, the strength of the battery frame with respect to loads inputted from the vehicle body lower side is improved.

In a battery mounting structure for a vehicle according to a second aspect relating to the present invention, in the battery mounting structure for a vehicle of the first aspect, the upper end portions and the lower end portions of the intermediate member are joined to, respectively, the lower face of the battery frame upper member and the upper face of the battery frame lower member by adhesive.

According to the second aspect relating to the present invention, the upper end portions of the intermediate member are joined to the lower face of the battery frame upper member with the adhesive and the lower end portions of the intermediate member are joined to the upper face of the battery frame lower member with the adhesive. Therefore, if the battery frame (the battery frame lower member) is deformed so as to bow toward the vehicle body upper side, the intermediate member braces between the battery frame lower member and the battery frame upper member effectively. Thus, deformation of the battery frame is more effectively suppressed.

Because the joining is by adhesive, even if there are gaps between the upper end portions of the intermediate member and the lower face of the battery frame upper member and between the lower end portions of the intermediate member and the upper face of the battery frame lower member, these portions and faces may be joined by appropriately changing a thickness of the adhesive.

In a battery mounting structure for a vehicle according to a third aspect relating to the present invention, in the battery mounting structure for a vehicle of the first aspect or the second aspect, the upper end portions and lower end portions of the intermediate member are respectively formed as flat surfaces.

According to the third aspect relating to the present invention, the upper end portions and lower end portions of the intermediate member are respectively made to be flat surfaces. Therefore, if the battery frame (the battery frame lower member) is deformed so as to bow toward the vehicle body upper side, the intermediate member more effectively braces between the battery frame lower member and the battery frame upper member. Thus, deformation of the battery frame is even more effectively suppressed.

Furthermore, at a time of joining with the adhesive, it may be assured that joining areas are large. Therefore, joining strengths between the battery frame upper member, the intermediate member and the battery frame lower member may be improved. Thus, the strength of the battery frame may be further improved.

In a battery mounting structure for a vehicle according to a fourth aspect relating to the present invention, in the battery mounting structure for a vehicle of any of the first to third aspects, vertical walls are formed between the upper end portions and lower end portions of the intermediate member.

According to the fourth aspect relating to the present invention, the vertical walls are formed between the upper end portions and lower end portions of the intermediate member. Therefore, cross-sectional deformation of the battery frame upper member and the battery frame lower member is suppressed, and cross-sectional strength of the battery frame is improved.

In a battery mounting structure for a vehicle according to a fifth aspect relating to the present invention, in the battery mounting structure for a vehicle of the fourth aspect, the vertical walls extend in a vehicle width direction.

According to the fifth aspect relating to the present invention, the vertical walls extend in the vehicle width direction. Therefore, the cross-sectional strength of the battery frame with respect to impact loads inputted in the vehicle width direction is improved. Accordingly, collision resistance performance of the vehicle when a side collision occurs is improved.

Advantageous Effects of Invention

As described hereabove, according to the first aspect relating to the present invention, the strength of a battery frame formed of a fiber-reinforced resin material with respect to loads inputted from the vehicle body lower side may be improved.

According to the second aspect relating to the present invention, deformation of the battery frame may be more effectively suppressed.

According to the third aspect relating to the present invention, the strength of the battery frame may be further improved and deformation of the battery frame may be even more effectively suppressed.

According to the fourth aspect relating to the present invention, the cross-sectional strength of the battery frame may be improved.

According to the fifth aspect relating to the present invention, the collision resistance performance of the vehicle when a side collision occurs may be improved.

DESCRIPTION OF EMBODIMENTS

Herebelow, exemplary embodiments relating to the present invention are described in detail in accordance with the drawings. For convenience of description, the arrow UP that is shown where appropriate in the drawings represents a vehicle body upward direction, the arrow FR represents a vehicle body forward direction, and the arrow OUT represents a vehicle width direction outer side. In the following descriptions, where the directions up, down, front, rear, left and right are used without being particularly specified, the same represent up and down in the vehicle body up-and-down direction, the front and rear in the vehicle body front-and-rear direction, and left and right in the vehicle body left-and-right direction (the vehicle width direction).

First Exemplary Embodiment

Figure 1:
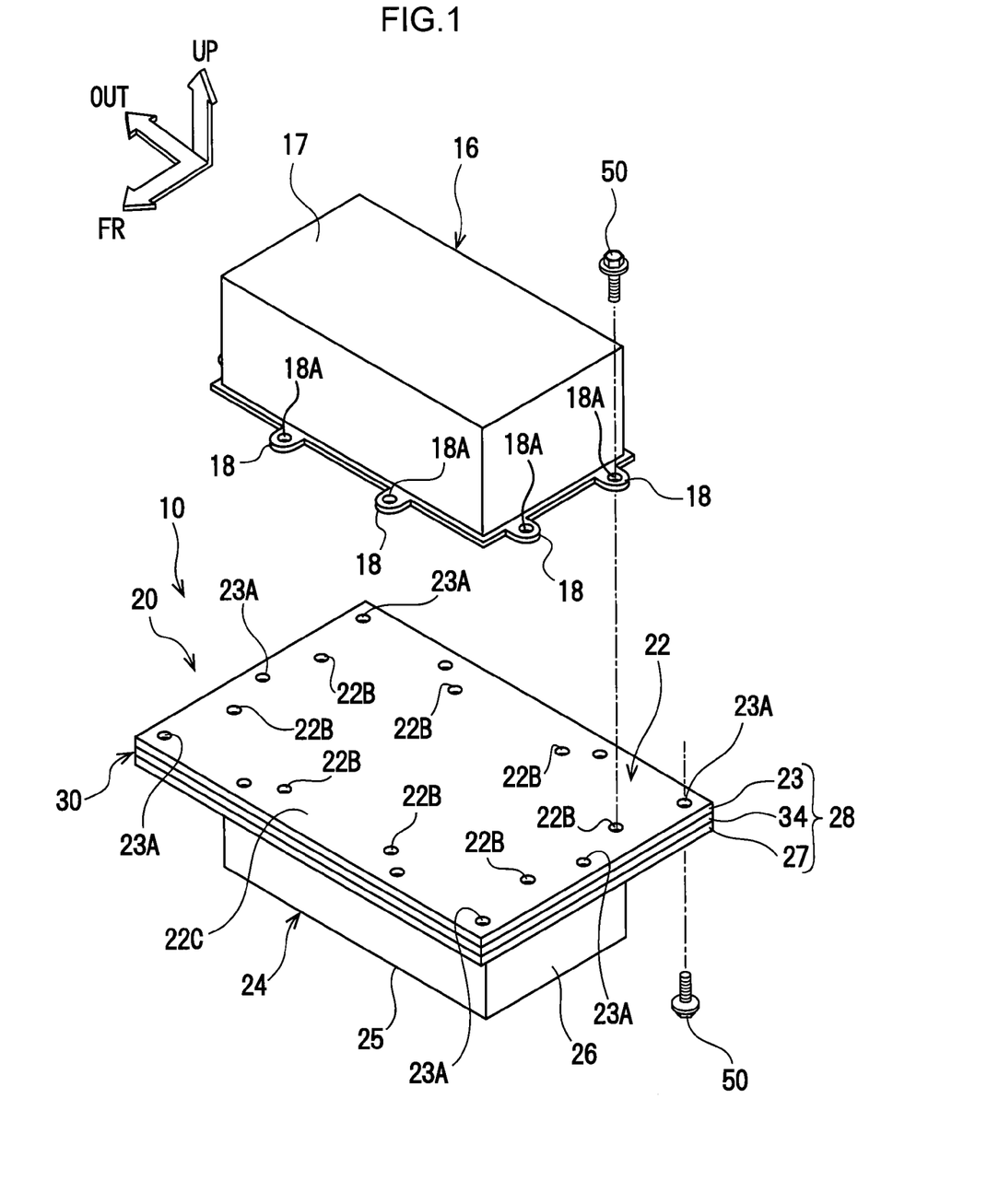
FIG. 1 is a perspective view showing a fuel cell stack and a battery frame that structures a battery mounting structure for a vehicle in accordance with present exemplary embodiments.
Figure 2:
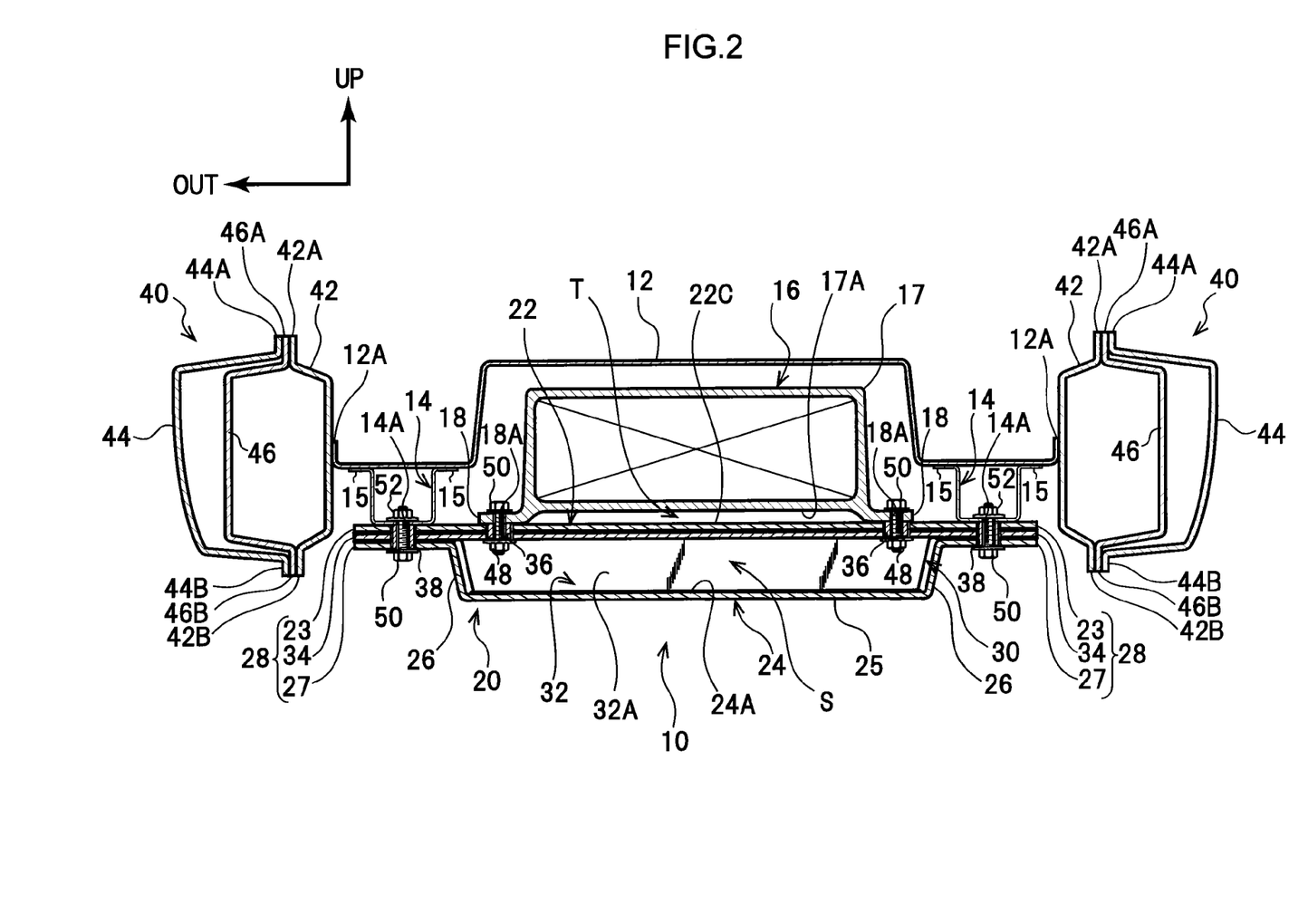
FIG. 2 is a front sectional diagram showing a battery mounting structure for a vehicle in accordance with a first exemplary embodiment.

A first exemplary embodiment is described. As shown in FIG. 1 and FIG. 2, a battery mounting structure for a vehicle 10 according to the present exemplary embodiment, which is employed in a vehicle such as an electric car or the like, is disposed at the vehicle body lower side of a floor panel 12 fabricated of metal, which structures a vehicle body floor. The battery mounting structure for a vehicle 10 includes a battery frame (a stack frame) 20 fabricated of a fiber-reinforced resin, which supports a fuel cell stack 16 that serves as a battery from the vehicle body lower side thereof.

Under members (side frames) 14 are disposed at a lower face of the floor panel 12. The under members 14 structure a vehicle body framework structure that extends in the vehicle front-and-rear direction. The under members 14 are formed of metal with substantial hat shapes in a sectional view. Flange portions 15 of the under members 14 that project in the vehicle width direction are joined, by welding or the like, to the lower face of the floor panel 12 at each of two outer side end portions thereof in the vehicle width direction.

Attachment holes 14A that penetrate through the under members 14 are formed in plural numbers along the length direction of the under members 14 (the vehicle front-and-rear direction). The attachment holes 14A are for the insertion of flange bolts 50, which are described below. Welded nuts 52 are provided at the upper faces of the under members 14, coaxially with the attachment holes 14A.

An exterior part 17 of the fuel cell stack 16 is formed of metal (or may be formed of resin) in a rectangular box shape. Projection portions 18 are formed integrally at plural predetermined positions of lower end peripheral edge portions of the exterior part 17. The projection portions 18 project to the outer sides. Penetrating holes 18A are formed in the projection portions 18 for insertion of the flange bolts 50.

Figure 3:
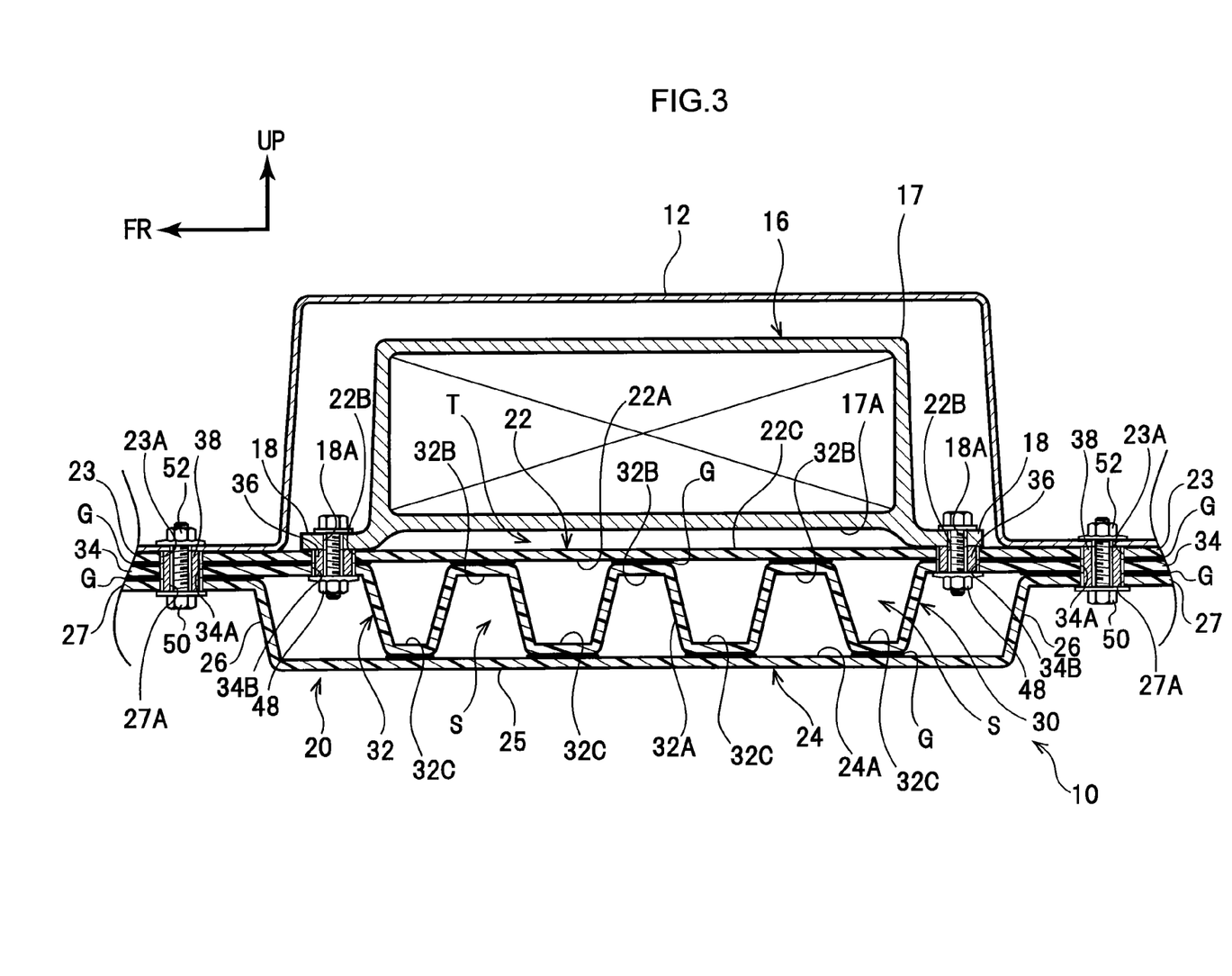
FIG. 3 is a side sectional diagram showing the battery mounting structure for a vehicle in accordance with the first exemplary embodiment.

As shown in FIG. 1 to FIG. 3, the battery frame 20 includes an upper frame 22 in a flat board shape, a lower frame 24 in a tray shape, and a partition member 30. The upper frame 22 serves as a battery frame upper member, the lower frame 24 serves as a battery frame lower member, and the partition member 30 serves as an intermediate member that is interposed between the upper frame 22 and the lower frame 24.

The lower frame 24 includes a flat board-shaped floor portion 25, flat board-shaped side wall portions 26 and flat board-shaped projection portions 27. The side wall portions 26 integrally stand at least from both of vehicle width direction end portions of the floor portion 25. The projection portions 27 integrally project to the vehicle width direction outer sides from upper end portions of the side wall portions 26. The partition member 30 includes a main body portion 32, which is formed substantially in a waveform shape in a side view seen in the vehicle width direction.

The main body portion 32 extends in the vehicle width direction (a length direction of the main body portion 32 is in the vehicle width direction). The main body portion 32 is structured by a plural number (eight in the illustrated structure) of vertical walls 32A, and flat board-shaped upper connecting portions 32B (upper end portions) and lower connecting portions 32C (lower end portions). The vertical walls 32A are arranged in a row in the vehicle body front-and-rear direction in a plan view. Alternating between upper and lower, the upper connecting portions 32B integrally connect upper end portions of the vertical walls 32A to one another and the lower connecting portions 32C integrally connect lower end portions of the vertical walls 32A to one another. (The vertical walls 32A are formed between the upper connecting portions 32B and the lower connecting portions 32C.)

In this structure, as shown in FIG. 3, neighboring vertical walls 32A (although standing substantially vertically) are inclined in opposite directions to one another at matching small angles in a side view. The upper connecting portions 32B and the lower connecting portions 32C connect, respectively, the upper end portions and the lower end portions of the vertical walls 32A to one another at the sides at which the spacings between the vertical walls 32A are smaller. In the case of the partition member 30 shown in the drawings, three of the upper connecting portions 32B are provided and four of the lower connecting portions 32C are provided.

Upper faces (flat surfaces) of the upper connecting portions 32B abut against or are disposed close to a lower face 22A of the upper frame 22. Lower faces (flat surfaces) of the lower connecting portions 32C abut against or are disposed close to an upper face 24A of the lower frame 24. The upper faces of the upper connecting portions 32B are joined to the lower face 22A of the upper frame 22 with an adhesive G, and the lower faces of the lower connecting portions 32C are joined to the upper face 24A of the lower frame 24 with the adhesive G.

The partition member 30 further includes flat board-shaped projection portions 34 that integrally project to the vehicle width direction outer sides at least from outer side end portions in the vehicle width direction of the main body portion 32. The projection portions 34 of the partition member 30 are joined to the projection portions 27 of the lower frame 24 with the adhesive G. Outer periphery portions 23 of the upper frame 22, which are vehicle width direction outer side end portions thereof, are joined to the projection portions 34 with the adhesive G.

Thus, the battery frame 20 is structured with a rectangular closed cross section structure. Within the closed cross section (enclosure) of the battery frame 20, a plural number (nine in the illustrated structure) of space regions S are partitioned by the partition member 30 (i.e., the vertical walls 32A spanning up and down between the upper frame 22 and the lower frame 24). Thus, the space regions S are formed with substantially the same shapes in a side view (and substantially the same volumes), and are arrayed in a single row in the vehicle front-and-rear direction.

If the upper faces of the upper connecting portions 32B and the lower faces of the lower connecting portions 32C are disposed close to, respectively, the lower face 22A of the upper frame 22 and the upper face 24A of the lower frame 24 (for example, being separated by 0.5 mm), these faces can be joined by appropriate regulation of thickness of the adhesive G (specifying the thickness).

As shown in FIG. 2, each of two end faces in the vehicle width direction of the vertical walls 32A abuts against or is disposed close to the inner faces of the side wall portions 26. These faces may be not joined or may be joined. Herebelow, the projection portions 27, projection portions 34 and outer periphery portions 23 that are joined to one another are referred to as flange portions 28 of the battery frame 20 (see FIG. 1 and FIG. 2). The flange portions 28 constitute portions of the battery frame 20 that are fixed to the under members 14.

As shown in FIG. 1 to FIG. 3, penetrating holes 22B are formed at plural predetermined positions of the upper frame 22, excluding the outer periphery portions 23. Plural attachment holes 34B are formed at proximal ends (near the vertical walls 32A) of the projection portions 34 of the partition member 30. The attachment holes 34B communicate with the penetrating holes 22B. Tubular collar members 36 that are fabricated of metal are insertedly installed coaxially in the penetrating holes 22B and the attachment holes 34B.

That is, flange nuts 48 are joined by adhesive to the lower faces of the proximal ends of the projection portions 34, coaxially with the attachment holes 34B, and the collar members 36 are integrally and coaxially provided at upper faces of the flange nuts 48. Thus, the collar members 36 are insertedly installed in the attachment holes 34B and the penetrating holes 22B in association with the joining of the flange nuts 48 to the projection portions 34.

Hence, the fuel cell stack 16 (the projection portions 18) is placed on an upper face 22C of the upper frame 22 such that the penetrating holes 18A of the projection portions 18 communicate with penetrating holes 36A of the collar members 36. The flange bolts 50 are inserted into the penetrating holes 18A and the penetrating holes 36A from the vehicle body upper side thereof, and are screwed into the flange nuts 48. Thus, the fuel cell stack 16 is fastened and fixed to the battery frame 20 (the upper frame 22). At this time, a cavity region T is formed between a floor face 17A of the exterior part 17 and the upper face 22C of the upper frame 22.

Plural numbers of penetrating holes 23A, 34A and 27A are formed, spaced at intervals in the vehicle body front-and-rear direction, in the flange portions 28, which is to say in the outer periphery portions 23 of the upper frame 22, the projection portions 34 of the partition member 30 and the projection portions 27 of the lower frame 24. The penetrating holes 23A, 34A and 27A communicate with one another, and are for the insertion of more of the flange bolts 50. Tubular collar members 38 that are fabricated of metal are insertedly installed coaxially in the penetrating holes 23A, 34A and 27A.

Thus, by the flange bolts 50 being inserted into penetrating holes 38A of the collar members 38 and the attachment holes 14A from the vehicle body lower side thereof and screwed into the welded nuts 52, the flange portions 28 of the battery frame 20 are fastened and fixed to the under members 14.

As shown in FIG. 2, outer side end portions in the vehicle width direction of the floor panel 12 are formed as inflected portions 12A, which are inflected upward. The inflected portions 12A are joined by welding or the like to inner panels 42 of rockers 40 that are fabricated of metal. Each rocker 40 is structured by the inner panel 42, an outer panel 44 and a reinforcement 46. The inner panel 42 is formed in a substantial hat shape in cross section. The outer panel 44 is formed in a substantial hat shape in cross section. The reinforcement 46 is disposed between the inner panel 42 and the outer panel 44, and is formed in a substantial hat shape in cross section.

That is, an upper flange portion 46A of the reinforcement 46 is joined to an upper flange portion 42A of the inner panel 42, and an upper flange portion 44A of the outer panel 44 is joined to the upper flange portion 46A. Further, a lower flange portion 46B of the reinforcement 46 is joined to a lower flange portion 42B of the inner panel 42, and a lower flange portion 44B of the outer panel 44 is joined to the lower flange portion 46B.

Thus, in the rocker 40, respective closed cross section structures are structured by the inner panel 42 and the reinforcement 46 and by the reinforcement 46 and the outer panel 44.

Now, operations of the battery mounting structure for a vehicle 10 according to the first exemplary embodiment as described above are described. Operations are described for: a case in which, as shown in FIG. 4, an interference object N on a road surface such as a rock or the like that is sticking up interferes with the lower frame 24 of the battery frame 20 during, for example, running of the vehicle on a poor road; and a case in which, as shown in FIG. 5, the vehicle has a side collision with a cylindrical pole P that extends in the vertical direction.

Figure 4:
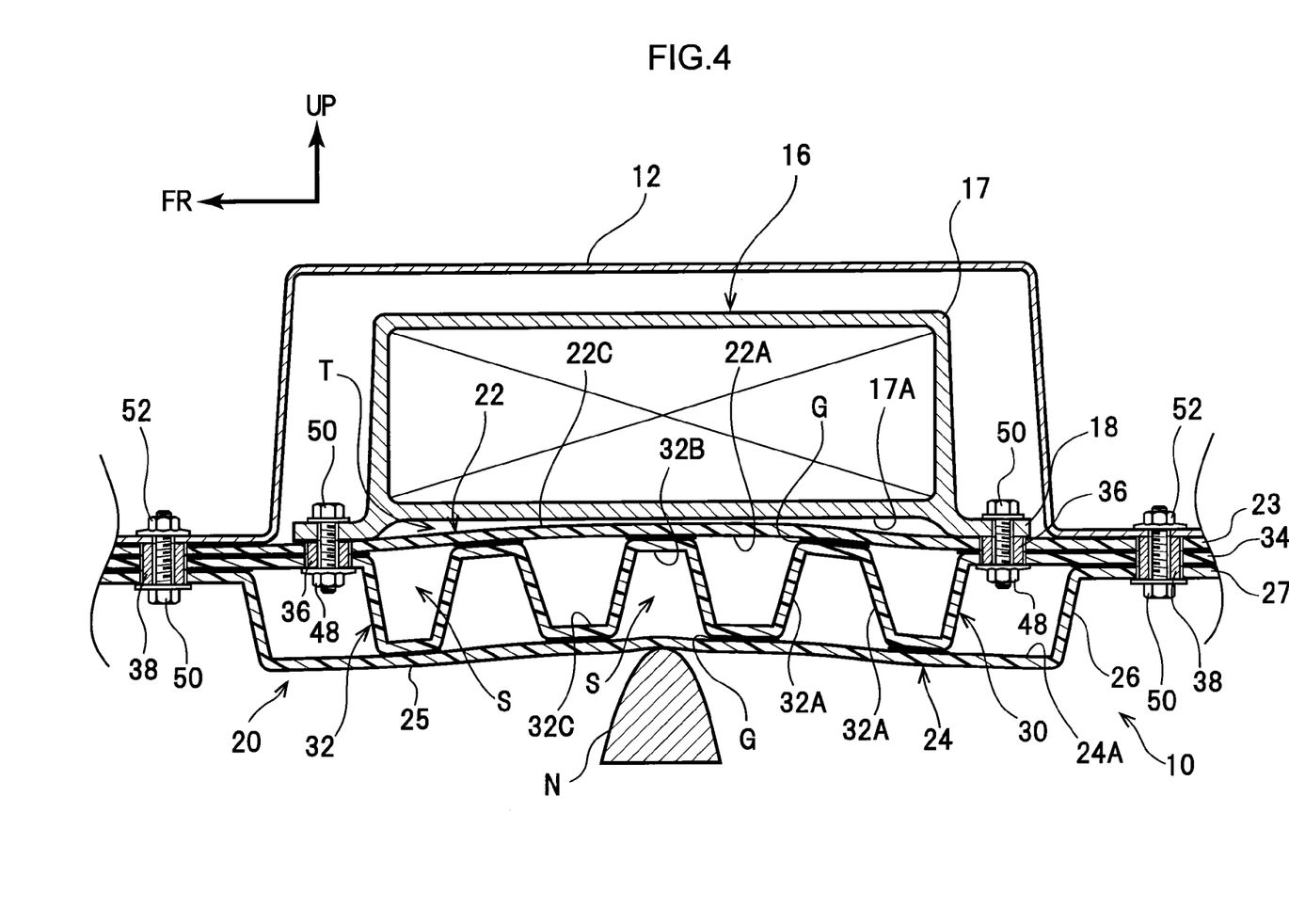
FIG. 4 is a side sectional diagram showing a state in which an interference object on a road surface is interfering, from the vehicle body lower side, with a battery frame that structures the battery mounting structure for a vehicle in accordance with the first exemplary embodiment.
Figure 5:
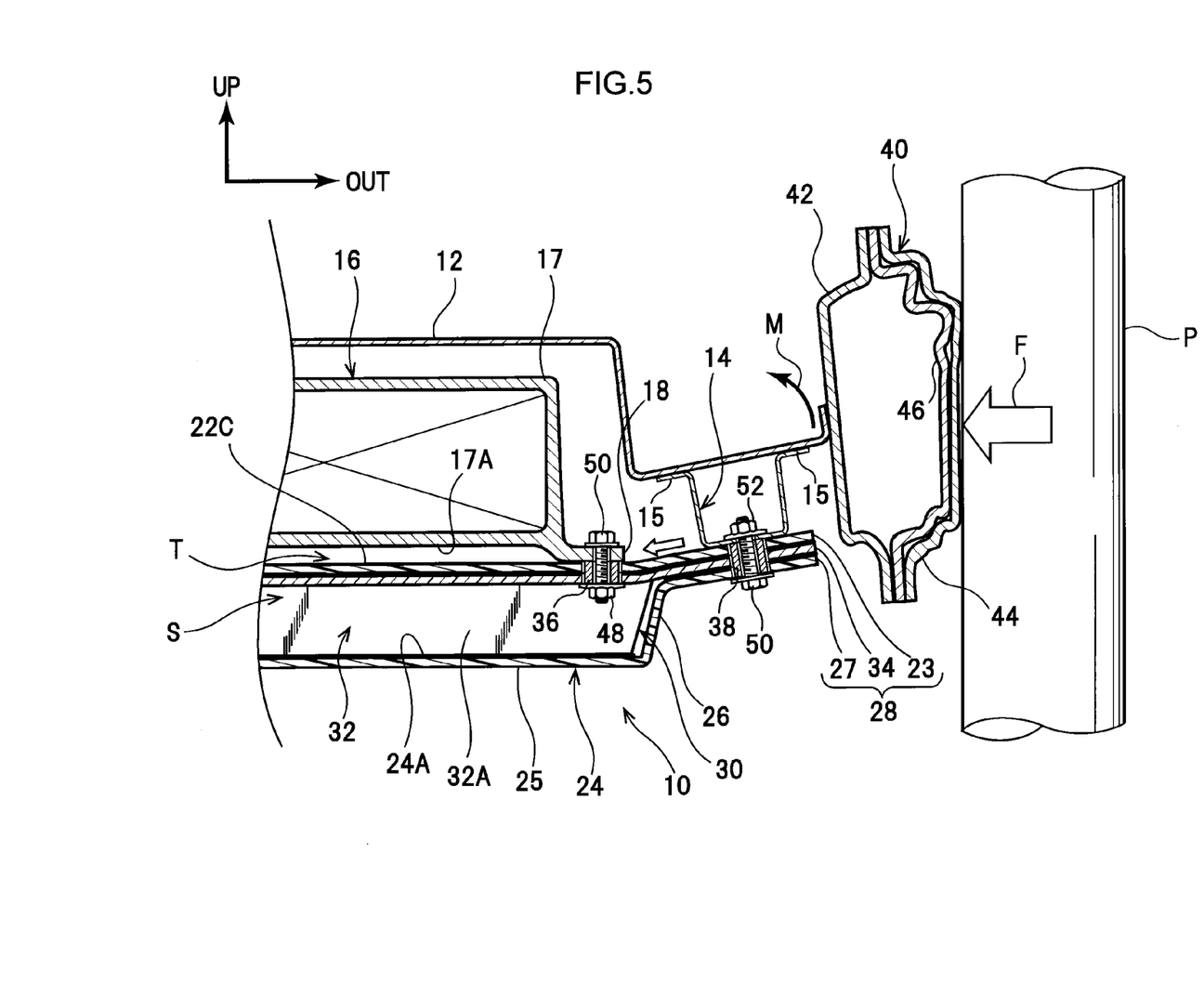
FIG. 5 is a front sectional diagram showing a state when a pole collides with a side face of the vehicle equipped with the battery mounting structure for a vehicle in accordance with the first exemplary embodiment.

As shown in FIG. 4, when the interference object N on the road surface interferes with the lower frame 24 of the battery frame 20, the battery frame 20 (the lower frame 24) resiliently deforms so as to bow upward. However, the battery frame 20 is provided with the partition member 30 that is formed in a substantial waveform shape in side view within the closed cross section (enclosure) that is structured by the lower frame 24 and the upper frame 22.

More specifically, the upper faces of the upper connecting portions 32B and the lower faces of the lower connecting portions 32C of the partition member 30 (the main body portion 32) are joined by the adhesive G to, respectively, the lower face 22A of the upper frame 22 and the upper face 24A of the lower frame 24 (i.e., the upper frame 22 and the lower frame 24 are connected by the plural vertical walls 32A.

Therefore, when the battery frame 20 (the lower frame 24) is resiliently deformed so as to bow upward, the partition member 30 (the main body portion 32) braces between the lower frame 24 and the upper frame 22, and the upper frame 22 provides resistance to tension forces towards the outer sides.

In particular, because the upper faces of the upper connecting portions 32B and the lower faces of the lower connecting portions 32C of the partition member 30 (the main body portion 32) are both formed as flat surfaces and joining areas thereof to the lower face 22A of the upper frame 22 and the upper face 24A of the lower frame 24 are assuredly large, joining strengths thereof are improved.

Therefore, strength (stiffness) of the battery frame 20 with respect to a load inputted from the vehicle body lower side by the interference object N on the road surface may be improved. That is, the resilient deformation may be accordingly suppressed by both the lower frame 24 and the overall closed cross section structure of the battery frame 20.

Because the cavity region T is formed between the upper face 22C of the upper frame 22 and the floor face 17A of the exterior part 17, even if the battery frame 20 resiliently deforms slightly so as to bow upward, interference (abutting) of the upper face 22C with the floor face 17A may be suppressed or prevented. Thus, even when an interference object N on a road surface interferes with the lower portions of the vehicle, the fuel cell stack 16 may be protected from a load that is inputted as a result.

Alternatively, as shown in FIG. 5, when the vehicle has a side collision with the pole P, a large impact load F is inputted to the rocker 40. As a result, the rocker 40 plastically deforms while moving to an inner side in the vehicle width direction thereof, and a portion of the inputted impact load F is transmitted to the floor panel 12 and the battery frame 20.

Now, the battery frame 20 is formed with a closed cross section structure, and the plural vertical walls 32A that extend in the vehicle width direction and connect up-and-down between the upper frame 22 and the lower frame 24 are provided inside this closed cross section (enclosure). That is, within the closed cross section of the battery frame 20, the plural space regions S that are arranged in a row in the vehicle body front-and-rear direction in side view are partitioned by the plural vertical walls 32A that stand substantially vertically (see FIG. 3).

Therefore, a cross-sectional moment of inertia of the battery frame 20 may be increased, and cross-sectional deformation (deformation that flexes in the vehicle body up-and-down direction) of the upper frame 22 and lower frame 24 may be suppressed. That is, cross-sectional strength of the battery frame 20 may be improved. In particular, collision resistance performance with respect to impact loads inputted in the vehicle width direction may be improved.

Therefore, when a side collision of the vehicle occurs, even though a bending moment M (and torque) is inputted to the proximal end of the flange portion 28 by the under member 14 that has been subjected to a portion of the impact load F via the floor panel 12, a deformation bending the proximal end of the flange portion 28 upward may be suppressed.

Thus, when the vehicle has a side collision, the portion of an impact load F that is inputted to the flange portion 28 is efficiently transmitted to the battery frame 20 (to the vertical walls 32A of the main body portion 32), and the fuel cell stack 16 may be protected from the impact load F. Note that, because the partition member 30 is formed of a fiber-reinforced resin material, similarly to the upper frame 22 and the lower frame 24, there is also an advantage in that an increase in weight of the vehicle may be moderated.

Second Exemplary Embodiment

Now, a second exemplary embodiment is described. Portions that are the same as in the above-described first exemplary embodiment are assigned the same reference numerals and are not described in detail (nor operations thereof).

Figure 6:
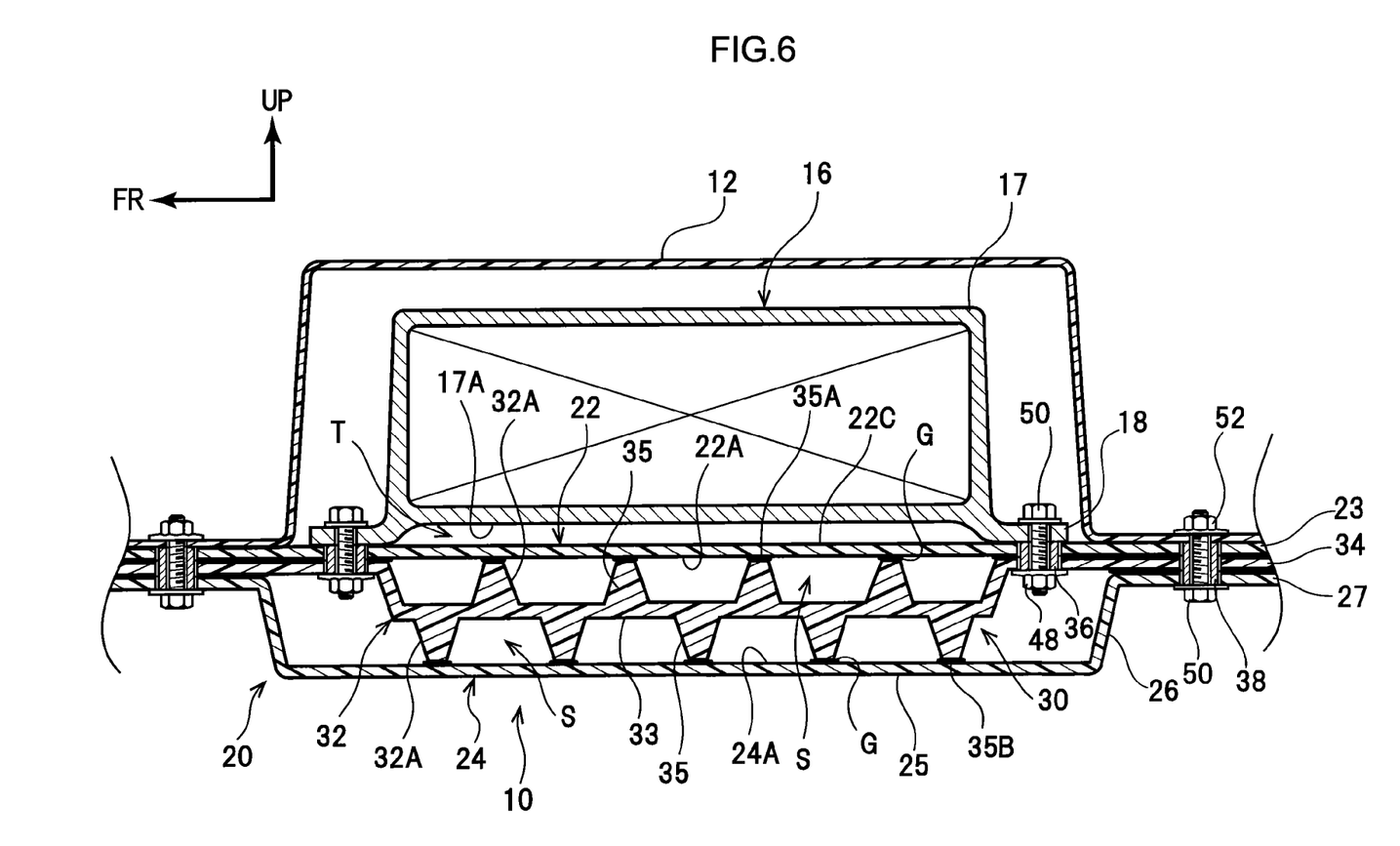
FIG. 6 is a side sectional diagram showing a battery mounting structure for a vehicle in accordance with a second exemplary embodiment.
Figure 7:
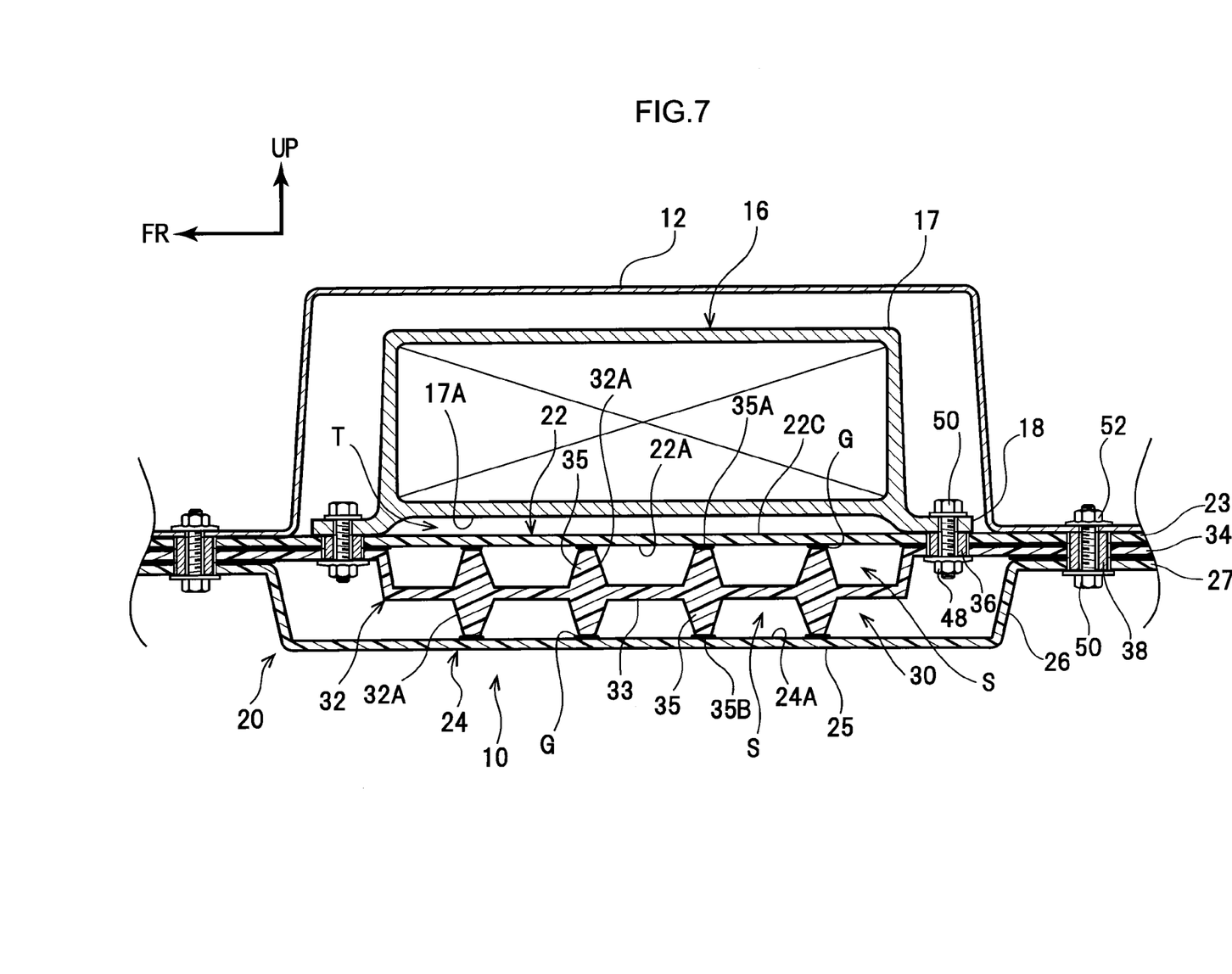
FIG. 7 is a side sectional diagram showing a battery mounting structure for a vehicle in accordance with the second exemplary embodiment.

As shown in FIG. 6 and FIG. 7, the main body portion 32 of the partition member 30 according to the second exemplary embodiment includes a support member 33 inside the closed cross section that is disposed to be parallel with the upper frame 22 and the lower frame 24. At least outer side end portions in the vehicle width direction of the support member 33 serve as the projection portions 34. Protrusion portions 35 are plurally formed at an upper face and a lower face of the support member 33. The protrusion portions 35 extend in the vehicle width direction (a length direction thereof is the vehicle width direction), and are formed in isosceles trapezoid shapes in a side sectional view.

The protrusion portions 35 shown in FIG. 6 do not protrude at the same positions above and below. The protrusion portions 35 at the lower face side (or upper face side) protrude at gaps between the protrusion portions 35 at the upper face side (or lower face side), which are in a row in the vehicle front-and-rear direction. In contrast, the protrusion portions 35 shown in FIG. 7 protrude at the same positions above and below. The protrusion portions 35 at the lower face side (or upper face side) protrude at the opposite sides, upper and lower, from the protrusion portions 35 at the upper face side (or lower face side), which are in a row in the vehicle front-and-rear direction.

Upper end faces 35A (upper end portions) of the protrusion portions 35 protruding from the upper face of the support member 33 and lower end faces 35B (lower end portions) of the protrusion portions 35 protruding from the lower face of the support member 33 are joined with an adhesive G to, respectively, the lower face 22A of the upper frame 22 and the upper face 24A of the lower frame 24.

Side walls of the protrusion portions 35 facing in the vehicle body front-and-rear direction (that stand substantially vertically) serve as the vertical walls 32A. Thus, the interior of the closed cross section (the enclosure) is partitioned into plural space regions S by the protrusion portions 35. In this second exemplary embodiment, the interior of the closed cross section is partitioned in the vehicle body up-and-down direction as well as in the vehicle body front-and-rear direction. Furthermore, because the upper end faces 35A and the lower end faces 35B are flat surfaces, similarly to the upper connecting portions 32B and lower connecting portions 32C of the first exemplary embodiment described above, joining areas may be assured.

Third Exemplary Embodiment

Now, a third exemplary embodiment is described. Portions that are the same as in the above-described first exemplary embodiment are assigned the same reference numerals and are not described in detail (nor operations thereof).

Figure 8:
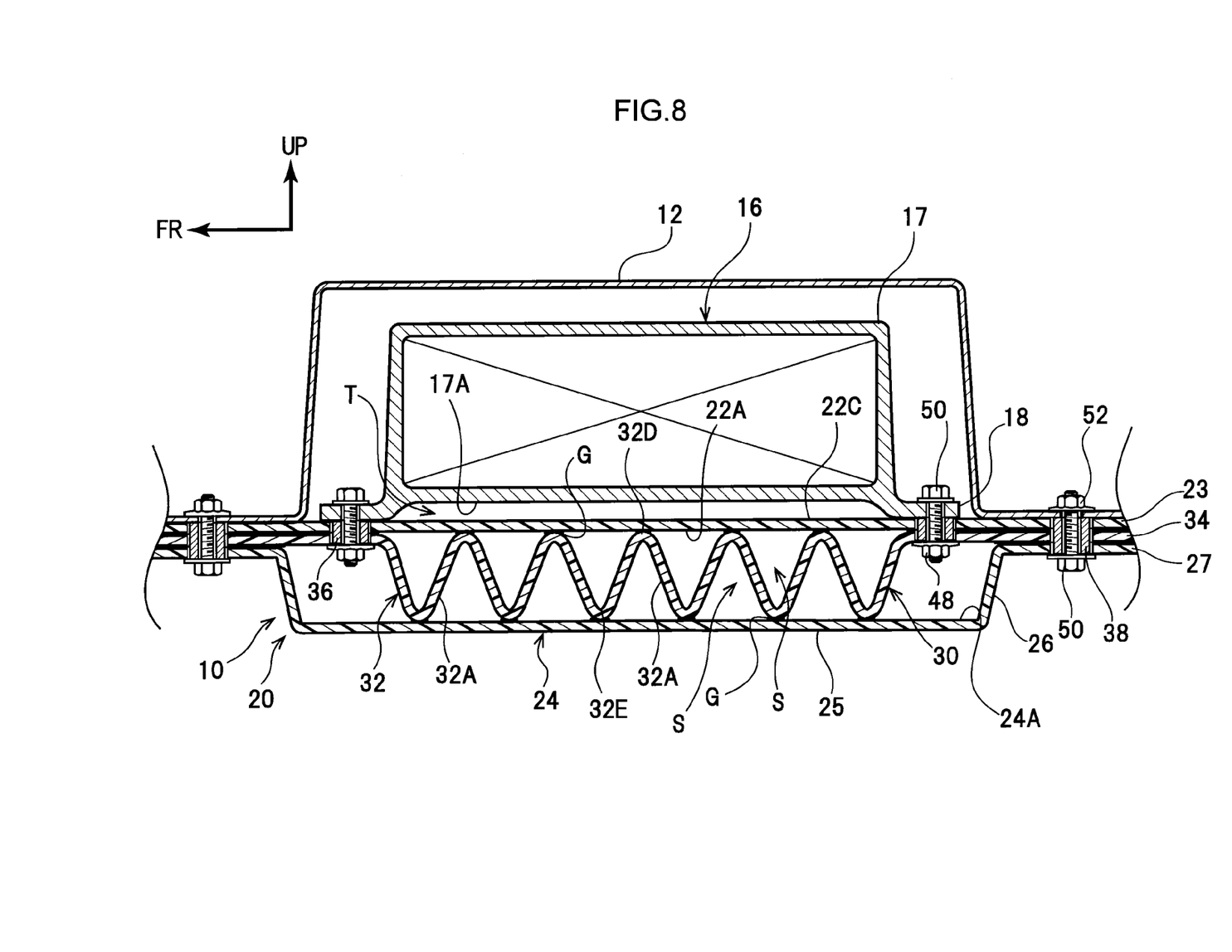
FIG. 8 is a side sectional diagram showing a battery mounting structure for a vehicle in accordance with a third exemplary embodiment.
Figure 9:
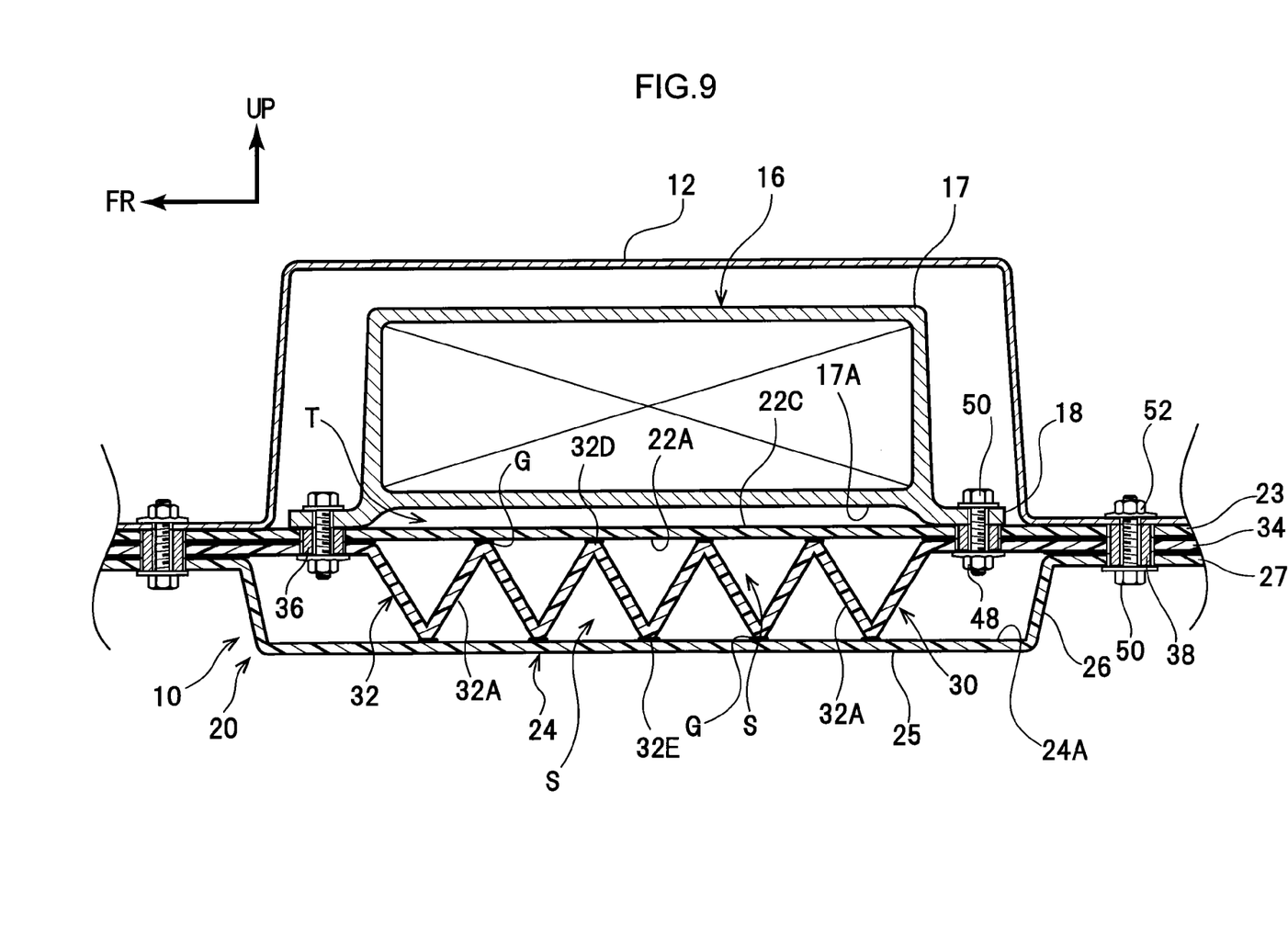
FIG. 9 is a side sectional diagram showing a battery mounting structure for a vehicle in accordance with the third exemplary embodiment.

As shown in FIG. 8 and FIG. 9, the main body portion 32 included in the partition member 30 according to the third exemplary embodiment is formed in a waveform shape in a side view. That is, upper end portions 32D and lower end portions 32E of the main body portion 32 shown in FIG. 8 are respectively formed in circular arc shapes in a side view. The upper end portions 32D and lower end portions 32E of the main body portion 32 shown in FIG. 9 are respectively formed in isosceles triangle shapes in a side sectional view.

That is, in the partition member 30 according to the third exemplary embodiment, the upper end portions 32D and the lower end portions 32E of the main body portion 32 are joined with the adhesive G to, respectively, the lower face 22A of the upper frame 22 and the upper face 24A of the lower frame 24. The upper end portions 32D and lower end portions 32E are not formed with flat surfaces (i.e., joining regions of the upper end portions 32D and the lower end portions 32E are formed in linear shapes in the vehicle width direction).

However, in the partition member 30 according to the third exemplary embodiment, numbers of the upper end portions 32D and lower end portions 32E that are joined with an adhesive G to, respectively, the lower face 22A of the upper frame 22 and the upper face 24A of the lower frame 24 may be increased compared to the first exemplary embodiment described above. Therefore, a reduction in strength of the battery frame 20 may be moderated.

Reference Example

Finally, a Reference Example is described. Portions that are the same as in the above-described first exemplary embodiment are assigned the same reference numerals and are not described in detail (nor operations thereof).

Figure 10:
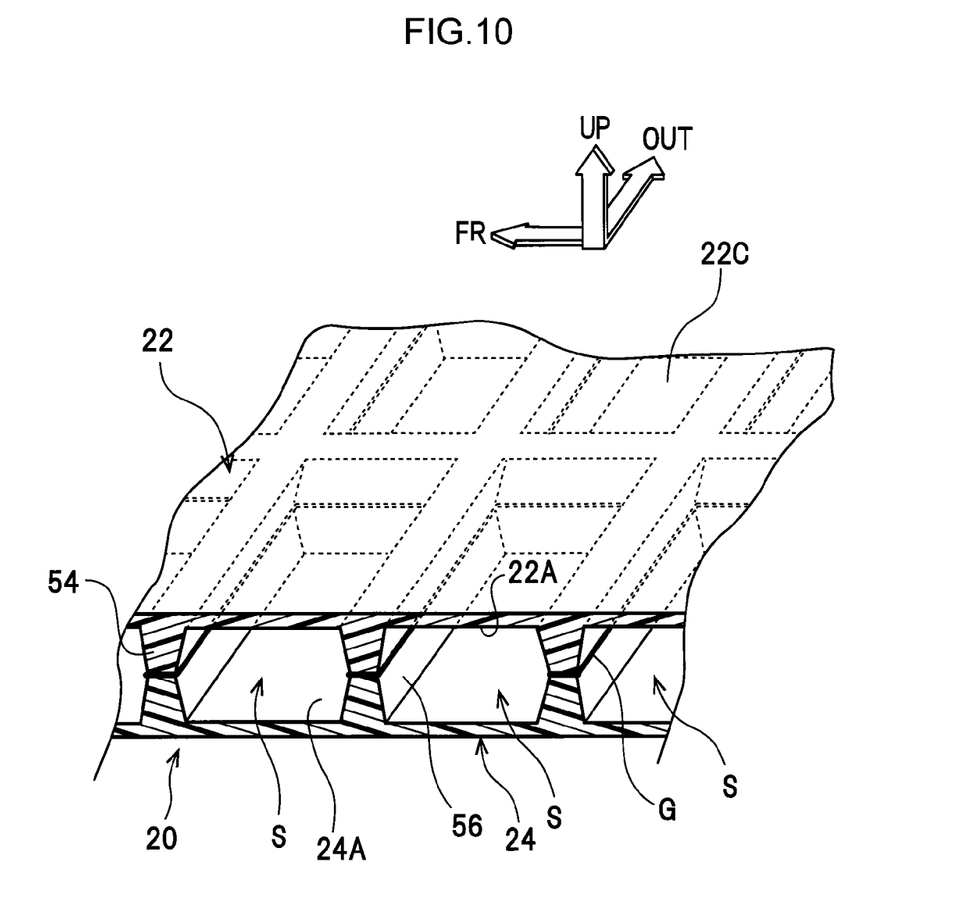
FIG. 10 is a perspective diagram showing a partial magnification of a battery frame that structures a battery mounting structure for a vehicle in accordance with a Reference Example.

As shown in FIG. 10, in the Reference Example, vertical walls 54 protrude from the lower face 22A of the upper frame 22. The vertical walls 54 protrude in a grid pattern that extends in the vehicle body front-and-rear direction and in the vehicle width direction. In addition, vertical walls 56 protrude from the upper face 24A of the lower frame 24. The vertical walls 56 protrude in the grid pattern that extends in the vehicle body front-and-rear direction and in the vehicle width direction. Lower end faces of the vertical walls 54 and upper end faces of the vertical walls 56 abut against or are disposed close to one another, and are joined with an adhesive G.

According to this structure, both cross-sectional strength of the battery frame 20 with respect to impact loads inputted in the vehicle width direction and cross-sectional strength of the battery frame 20 with respect to impact loads inputted in the vehicle body front-and-rear direction may be improved. That is, both impact loads inputted when the vehicle has a side collision and impact loads inputted when the vehicle has a front collision or a rear collision are efficiently transmitted to the battery frame 20. Thus, collision resistance performance with respect both to side collisions of the vehicle and to front collisions and rear collisions may be improved.

A structure is also possible in which only the vertical walls 54 protrude from the lower face 22A of the upper frame 22, to a height that reaches the upper face 24A of the lower frame 24, and a structure is possible in which only the vertical walls 56 protrude from the upper face 24A of the lower frame 24, to a height that reaches the lower face 22A of the upper frame 22.

The upper frame 22 and the lower frame 24 may be connected by vertical walls that are separate bodies arranged in the grid pattern (not shown in the drawings). Further, the vertical walls 54 and 56 are not limited to structures that protrude in a grid pattern. Structures are also possible in which vertical walls protrude so as to extend only in the vehicle width direction or the vehicle body front-and-rear direction (such that the length direction thereof is the vehicle width direction or the vehicle body front-and-rear direction).

Hereabove, the battery mounting structure for a vehicle 10 according to the present exemplary embodiments is described by reference to the drawings. However, the battery mounting structure for a vehicle 10 according to the present exemplary embodiments is not limited to the structures shown in the drawings; suitable design modifications are possible without deviating from the scope of the present invention. For example, the collar members 36 may be structured as separate bodies from the flange nuts 48.

Further, the upper connecting portions 32B and lower connecting portions 32C, upper end faces 35A and lower end faces 35B, and upper end portions 32D and lower end portions 32E may be structures that are not joined to, respectively, the lower face 22A of the upper frame 22 and the upper face 24A of the lower frame 24. However, structures that are joined are more desirable with regard to improving the strength of the battery frame 20.

When these portions/faces are joined, joining by rivets, welding or the like is possible. However, joining by an adhesive G is more desirable in being adaptable to cases in which there are gaps between these portions/faces and, respectively, the lower face 22A of the upper frame 22 and the upper face 24A of the lower frame 24. Further yet, the battery frame 20 according to the present exemplary embodiment is not limited to being a structure that supports the fuel cell stack 16.

In the first to third exemplary embodiments described above, the vertical walls 32A of the main body portion 32 of the partition member 30 extend in the vehicle width direction (the length direction thereof is the vehicle width direction). However, structures are possible in which the vertical walls 32A extend in the vehicle body front-and-rear direction (the length direction thereof is the vehicle body front-and-rear direction). In this case, collision resistance performance of the battery frame 20 with respect to front collisions, rear collisions and the like of the vehicle may be improved.

The invention claimed is:

1. A battery mounting structure for a vehicle, comprising:
   a battery frame upper member fabricated of fiber-reinforced resin to which a battery is attached, the battery being disposed at a vehicle body lower side of a floor panel;
   a battery frame lower member fabricated of fiber-reinforced resin that, with the battery frame upper member, structures a closed cross section structure; and
   an intermediate member fabricated of fiber-reinforced resin that is interposed between the battery frame upper member and the battery frame lower member, the intermediate member being provided with:
   a plurality of upper end portions that abut against or are disposed close to a lower face of the battery frame upper member, and
   a plurality of lower end portions that abut against or are disposed close to an upper face of the battery frame lower member.

2. The battery mounting structure for a vehicle according to claim 1, wherein the upper end portions and the lower end portions of the intermediate member are joined to, respectively, the lower face of the battery frame upper member and the upper face of the battery frame lower member by adhesive.

3. The battery mounting structure for a vehicle according to claim 1, wherein the upper end portions and the lower end portions of the intermediate member are respectively formed as flat surfaces.

4. The battery mounting structure for a vehicle according to claim 1, wherein vertical walls are formed between the upper end portions and the lower end portions of the intermediate member.

5. The battery mounting structure for a vehicle according to claim 4, wherein the vertical walls extend in a vehicle width direction.

* * * * *